J. E. O'SULLIVAN.
VALVE SPRING COMPRESSOR AND VALVE GRINDING TOOL.
APPLICATION FILED DEC. 18, 1919.

1,379,310.

Patented May 24, 1921.

WITNESSES
George G. Myers
C. E. Trainor

INVENTOR
J. E. O'SULLIVAN,
BY
ATTORNEYS

UNITED STATES PATENT OFFICE.

JOSEPH EUGENE O'SULLIVAN, OF NORTH MADISON, INDIANA.

VALVE-SPRING COMPRESSOR AND VALVE-GRINDING TOOL.

1,379,310.  Specification of Letters Patent.  Patented May 24, 1921.

Application filed December 18, 1919. Serial No. 345,693.

*To all whom it may concern:*

Be it known that I, JOSEPH EUGENE O'SULLIVAN, a citizen of the United States, and a resident of North Madison, in the county of Jefferson and State of Indiana, have invented certain new and useful Improvements in Valve-Spring Compressors and Valve-Grinding Tools, of which the following is a specification.

My invention is an improvement in valve spring compressors and valve grinding tools, and has for its object to provide a simple, inexpensive device of the character specified, by means of which the springs of valves of the overhead and cage type may be compressed easily and uniformly, and by means of which the valve may be ground.

Figure 1:
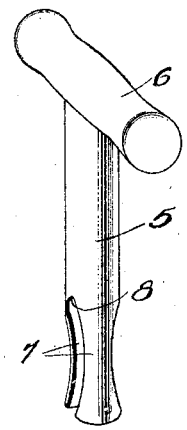
Figure 1 is a perspective view of the improved tool.

The present embodiment of the invention is shown in connection with the valve 1 of usual type, the said valve having the stem 2, which moves in the guide 3 of the seat 4. The usual spring is provided in connection with the stem, for normally seating the valve, and the stem has a transverse opening near its outer end for connection with the stop for the outer end of the spring.

The tool consists of a shank 5 having at one end a cross head 6 shaped to form a grip and rigid with the shank, and the other end is bifurcated or forked longitudinally to form two arms 7 which extend approximately parallel with each other in spaced relation, defining a recess relatively deep, the purpose of which will later appear.

The outer faces of the ends of these arms which are remote from the grip are plane, at the same level, and perpendicular to the axis of the shank, and they are designed to abut squarely the washer placed on the outer end of the spring, on each side of the stem, to compress the spring, when the shank is forced downwardly.

Figure 2:
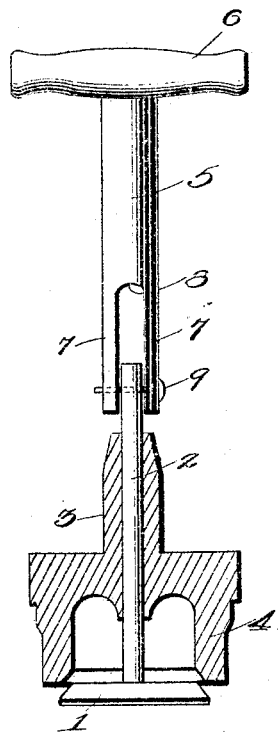
Fig. 2 is a front view showing the tool in use.

The recess 8 between the arms 7 is of sufficient relative depth to receive the stem 2 upon a considerable compression of the spring, and the arms have alining transverse perforations therethrough, which are adapted to receive a cross pin 9, to connect the tool to the valve stem, as shown in Fig. 2, when used in grinding or regrinding the valve and seat.

One use of the improved tool is to compress the spring so that the cross pin ordinarily used to retain the washer can be removed. The plane ends of the arms 7 are engaged with the washer on opposite sides of the stem, and the washer is pushed toward the seat, thus compressing the spring, whereupon the aforesaid cross pin can be readily removed.

The cross pin may now be removed, and the washer and spring detached. The pin 9 is now used to connect the tool to the valve, and it will be evident that by turning the tool the valve may be rotated to grind the same. In grinding the valve is turned to right and to left, to evenly grind the same, and the tool provides a firm grip on the valve.

The shank 5 is circular in cross section through a major portion of its extent and the engaging end of the shank is circular, and rests upon the valve spring disk or washer snugly when in use. However, it is preferable that opposite sides of the shank at the recess 8 are concaved as shown, to receive the fingers to easily reach the valve stem key, and permit its ready removal.

I claim:

A tool as herein characterized and comprising a shank member and a transverse head member rigidly connected with the said shank at one end and projecting to each side thereof, said head serving as a handle, said shank having its opposite end bifurcated and defining spaced arms of equal length and a relatively deep recess extending into the shank, the outer faces of the ends of the spaced arms being flat, defining shoulders adapted to abut the conventional valve spring retaining washer, whereby such spring may be compressed longitudinally, said shank being concaved on opposite faces at the side edges of said recess, said concavities adapted to permit the fingers to grip and remove the conventional spring washer retaining cross pin from the valve stem, the stem of the valve adapted to be disposed within the recess between the before mentioned arms, and said arms having alined lateral perforations through the same adjacent their free ends for the reception of a pin projecting laterally from the valve stem to couple the same with the shank, whereby the tool may be used to grind or regrind the valve and its seat.

JOSEPH EUGENE O'SULLIVAN.